(12) United States Patent
Chen et al.

(10) Patent No.: US 7,502,475 B2
(45) Date of Patent: Mar. 10, 2009

(54) METHOD AND SYSTEM FOR SECURE KEY GENERATION

(75) Inventors: Sherman (Xuemin) Chen, San Diego, CA (US); Iue-Shuenn Chen, San Diego, CA (US); Robert Brownhill, San Diego, CA (US); Wade K. Wan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 747 days.

(21) Appl. No.: 10/713,415

(22) Filed: Nov. 14, 2003

(65) Prior Publication Data

US 2005/0105736 A1 May 19, 2005

(51) Int. Cl.
*H04L 9/00* (2006.01)
*G06F 11/30* (2006.01)
*G06F 7/04* (2006.01)

(52) U.S. Cl. ............... 380/277; 380/278; 380/279; 380/280; 713/189; 713/190; 713/191; 713/192; 713/193; 726/16; 726/17; 726/18; 726/19; 726/20

(58) Field of Classification Search .......... 380/277
See application file for complete search history.

(56) References Cited

U.S. PATENT DOCUMENTS 5,420,928 A 5/1995 Aiello et al.

7,028,014 B1 * 4/2006 Naclerio ............... 705/401
2003/0007644 A1 * 1/2003 Sprunk ................. 380/277

FOREIGN PATENT DOCUMENTS

EP 0343805 A 11/1989

OTHER PUBLICATIONS

Schneier ("Applied Cryptography, Second Edition", 1996).*
Conditional Access System for Terrestrial Broadcast and Amendment No. 1, ATSC Standard, Doc. A/70, Jul. 17, 1999; Amendment No. 1, May 31, 2000.

* cited by examiner

*Primary Examiner*—Longbit Chai
(74) *Attorney, Agent, or Firm*—McAndrews, Held & Malloy, Ltd.

(57) ABSTRACT

Certain aspects of the invention for producing a secure key may comprise a secure key generator that receives a first, second and third input keys and utilizes these keys to generate a first output key. The first, second and third input keys may be a customer key, customer key selection and key variation, respectively. The first output key may be generated so that it is unique, differs from the first input key and is not a weak or semi-weak key. The first, second and third input keys may be mapped to generate mapped output key data and an intermediate key generated based on the first input key. The intermediate key and the output key data may be scrambled to create a scrambled output. At least a portion of the output key data may be masked and XORed with the scrambled output to generate the first output key.

44 Claims, 4 Drawing Sheets

METHOD AND SYSTEM FOR SECURE KEY GENERATION

CROSS-REFERENCE TO RELATED APPLICATIONS/INCORPORATION BY REFERENCE

Not Applicable.

FIELD OF THE INVENTION

Certain embodiments of the invention relate to conditional access and copy protection systems. More specifically, certain embodiments of the invention relate to a method and system for secure key generation.

BACKGROUND OF THE INVENTION

Digital television, popularly referred to as DTV, is an enhanced television system capable of transmitting and receiving digitized signals, displaying digital images and playing digital audio. While some of these features may be present in current analog television systems such as national television standards committee (NTSC), sequential couleur avec memoire (SECAM) and phase alternate line (PAL), the combination of digitized transmission, reception, video and audio distinguishes digital television from current analog television systems.

The technology utilized by digital television is superior to current analog television systems and utilizes scarce bandwidth in a more spectrum efficient manner. In this regard, digital television allows more channels containing more information to be broadcasted within an equivalent bandwidth utilized by current analog television systems. Accordingly, any excess bandwidth can be re-allocated for use by other types of communication systems. Broadcasters utilizing digital television systems are therefore, capable of providing over-the air television signals containing higher picture resolutions than current analog broadcast television systems. For these reasons, Congress had mandated that current broadcast television service must, in time, be completely converted to digital television.

In order to provide these high resolution television signals, digital television systems utilize various video and audio compression techniques, for example, moving picture experts group (MPEG). MPEG is a joint committee of the international standardization organization (ISO) and the international electrotechnical commission (IEC), and is generally referred to as ISO/IEC JTC1/SC29/WG11. MPEG includes various charter groups, each of which contains a diverse representation from among computer, telecommunications, television, cable, satellite, and other industries worldwide. The charter of various MPEG video and audio groups is to develop compression standards for full-motion video, associated audio and their multiplex for digital storage media. These compression standards are also utilized by digital cable television systems and digital satellite systems. Although compression standards are promulgated by the various groups, transmission and encryption or conditional access techniques are not specified in the MPEG standards. Accordingly, system designers and integrators may freely determine and implement their own transmission or conditional access techniques.

Additionally, in some conventional audio/video processing systems, audio/video data such as movies are vulnerable to piracy and require protection against illegal copying. The loss associated with piracy and unauthorized copying is greatest in high value movies and video programs. Since uncompressed digital video in clear form can be used to create perfect copies of the high value programs in particular, it is necessary to enable the protection of uncompressed video with copy protection technology. To protect against piracy or unauthorized copying, video data such as high value video content is sometimes compressed and encrypted before it can be accessed in memory and storage devices. Video decoding and de-compression systems generally utilize frame buffers for motion prediction, which may provide enhanced picture quality. Video images or pictures stored in these frame buffers are un-compressed and clear. Accordingly, attackers or hackers may utilize various schemes to access these buffers and copy the video images.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for producing a secure key. Aspects of the method may comprise the steps of receiving at least a first input key, a second input key and a third input key and generating a first output key based on at least the first input key, the second input key and the third input key. The first output key is generated so as to ensure that it is unique and that it differs from the first input key. The first input key may be a customer key, the second input key may be a customer key selection and the third input key may be a key variation. Notwithstanding, it may be determined whether the first output key is a unique key and/or is not equivalent to the first input key. If it is determined that the first output key is not a unique key and/or is equivalent to the first input key, then a second output key may be generated based on a modified one of at the first input key, second input key and/or third input key. It may further be determined whether the second output key is a unique key and/or is not equivalent to the modified one of the first input key, the second input key and/or the third input key. The first output key and the second output key may not be a weak key or a semi-weak key.

In another aspect of the invention, the first input key, the second input key and the third input key may be mapped in order to generate mapped output key data. An intermediate key may also be generated based on the first input key. The generated intermediate key and the generated mapped output key data may be scrambled to create a scrambled output. At least a portion of the generated mapped output key data may be masked and exclusive ORed with the scrambled output to generate the first output key. The generated first output key may subsequently be transferred to an encryption engine that utilizes the generated first output key to encrypt information.

Another embodiment of the invention may provide a machine-readable storage, having stored thereon, a computer program having at least one code section for producing a secure key. The at least one code section may be executable by a machine, thereby causing the machine to perform the steps as described above for producing a secure key.

In another embodiment of the invention, the system for producing a secure key may comprise a secure key generator that receives at least a first input key, a second input key and a third input key. Accordingly, the secure key generator may generate a first output key based on at least the first input key, the second input key and the third input key. The first output key is generated so that it is a unique key and differs from at least the first input key. The first input key may be a customer key, the second input key a customer key selection and the third input key a key variation. The first output key and the second output key may not be a weak and/or a semi-weak key. The secure key generator may determine whether the first output key is a unique key and is not equivalent to at least the first input key. If the secure key generator determines that the first output key is a non-unique key and/or is equivalent to at least the first input key, the secure key generator may generate a second output key based on a modified one of the first input key, the second input key and/or the third input key. The secure key generator may also determine whether the second output key is a unique key and/or is not equivalent to at least the modified first input key, second input key and/or third input key.

The system may further comprise a mapper that maps at least the first input key, the second input key and the third input key to generate mapped output key data. A key generator may generate an intermediate key based on the first input key. A scrambler may scramble the generated intermediate key and the generated mapped output key data to create a scrambled output. A masker may mask at least a portion of the generated mapped output key data and an exclusive OR operator may exclusive OR the masked portion of the generated mapped output key data and the scrambled output to generate the first output key. The secure key generator may transfer the generated first output key to an encryption engine that may utilize the generated first output key to encrypt information.

Another embodiment of a system for producing a secure key in accordance with various aspects of the invention may comprise a mapper. A scrambler and a masker may be coupled to the mapper. A key generator may also be coupled to the scrambler and an XOR operator may be coupled to the masker and the scrambler. In this arrangement, an output of the XOR gate functions as an output of the system for producing a secure key. At least one processor and/or an encryption engine may be coupled to an output of the XOR operator. A memory may also be coupled to the encryption engine and/or the processor.

These and other advantages, aspects and novel features of the present invention, as well as details of an illustrated embodiment thereof, will be more fully understood from the following description and drawings.

DETAILED DESCRIPTION OF THE INVENTION

Figure 1:
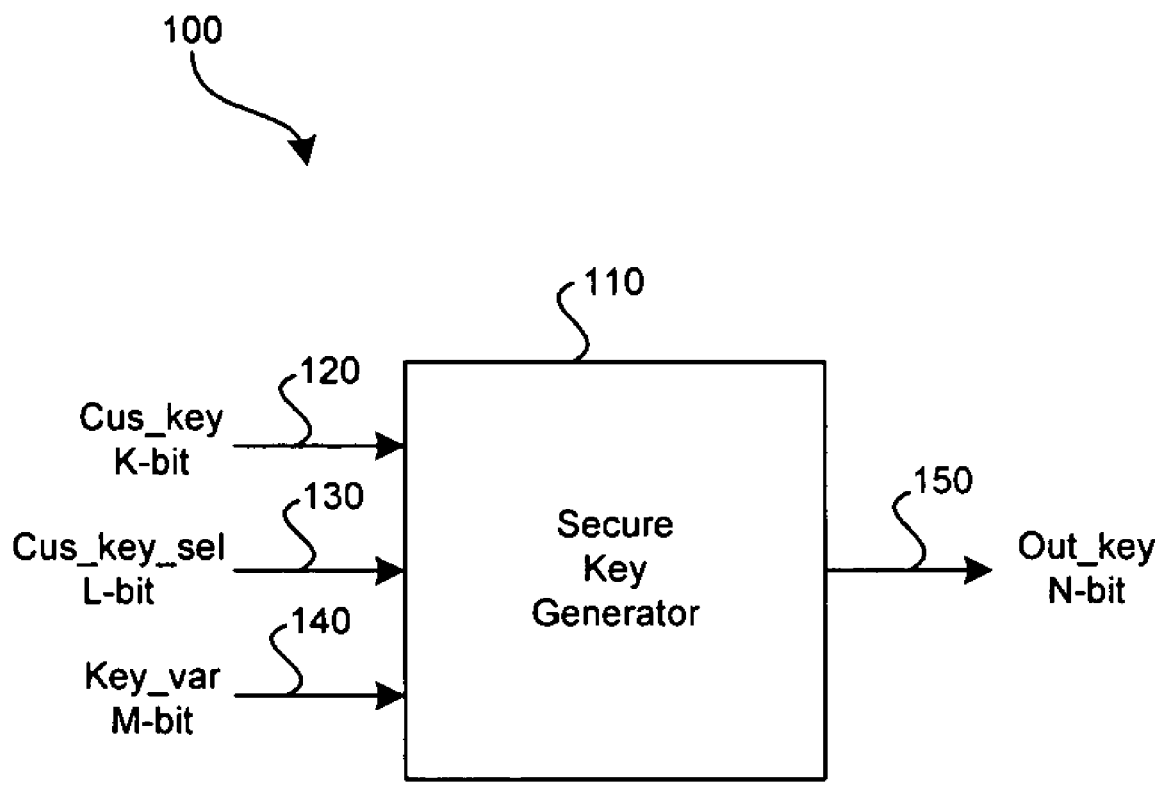
FIG. 1 is a high level block diagram of system that may be utilized in connection with generating an output key from a plurality of input keys utilizing a secure key generator, in accordance with an embodiment of the invention.

In digital cable and satellite systems, high value movies and video programs or content may be protected by conditional access (CA) or copy protection (CP) scrambling systems. In this regard, scrambling keys may be controlled and encrypted by the CA or CP system and as part of playback or during reception, these keys may be decrypted and utilized to descramble the content in a set-top box (STB), for example. Aspect of the invention provide a method and system for generating user conditional access or copy protection keys by securely manipulating a number of input keys.

In a system that utilizes an encryption or decryption engine such as DES, 3DES or AES, the protection of the key is one of the most important tasks for ensuring its security. For many applications, a key may be generated from a number of input keys. The generated key may be referred to as an output key. Typically, the output key may be generated from any combination of a customer key, a customer key selection and a key variation. The customer key is a key that may be assigned to a given vendor of a STB. A customer key selection is a key that may be assigned to be utilized for different operating modes. For example, a particular customer key selection may be utilized for live decoding mode and another utilized for playback mode. A key variation is a key that may be utilized to differentiate between different set-top boxes (STBs). In general, the key generation process may be executed in such a manner that it satisfies various security requirements.

Accordingly, certain embodiments of the invention may be found in a method and system for producing a secure key. In accordance with an embodiment of the invention, aspects of the method may comprise receiving at least a first input key, a second input key and a third input key and generating a first output key based on at least the first input key, second input key and third input key. The first output key is generated so as to ensure that it is unique and that it differs from the first input key. The first input key may be a customer key, the second input key may be a customer key selection and the third input key may be a key variation.

Notwithstanding, it may be determined whether the first output key is a unique key and/or is not equivalent to the first input key. If it is determined that the first output key is not a unique key and/or is equivalent to the first input key, then a second output key may be generated based on a modified first input key, a modified second input key and/or a modified third input key. In either case, a determination may be made as to whether the second output key is a unique key and/or is not equivalent to the modified first input key, the second input key and/or the third input key. The first output key and the second output key may not be a weak key or a semi-weak key.

The first input key, the second input key and the third input key may be mapped by a mapping function in order to generate mapped output key data. An intermediate key may also be generated based on the first input key. The generated intermediate key and the generated mapped output key data may be scrambled to create a scrambled output. At least a portion of the generated mapped output key data may be masked and exclusive ORed with the scrambled output to generate the first output key. The generated first output key may subsequently be transferred to an encryption engine that utilizes the generated first output key to encrypt information.

FIG. 1 is a high level block diagram of system 100 that may be utilized in connection with generating an output key from a plurality of input keys utilizing a secure key generator, in accordance with an embodiment of the invention. Referring to FIG. 1, there is shown a secure key generation function block 110; a first input key which is a customer key, cust_key 120; a second input key which is a customer key selection, cus_key_sel 130; a third input key which is a key variation, key_var 140; and an output key out_key 150. The customer key, cus_key 120, may be a K-bit customer key and the customer key selection, cus_key_sel 130, may be an L-bit customer selection vector. The input key variation key_var 140, may be an M-bit key variation vector and the output key, out_key 140, may be an N-bit manipulated key. In operation, the secure key generation function 110 receives the input keys, cus_key 120, cus_key_sel 130, key_var 140 and accordingly, generates the output key, out_key 150.

Figure 2:
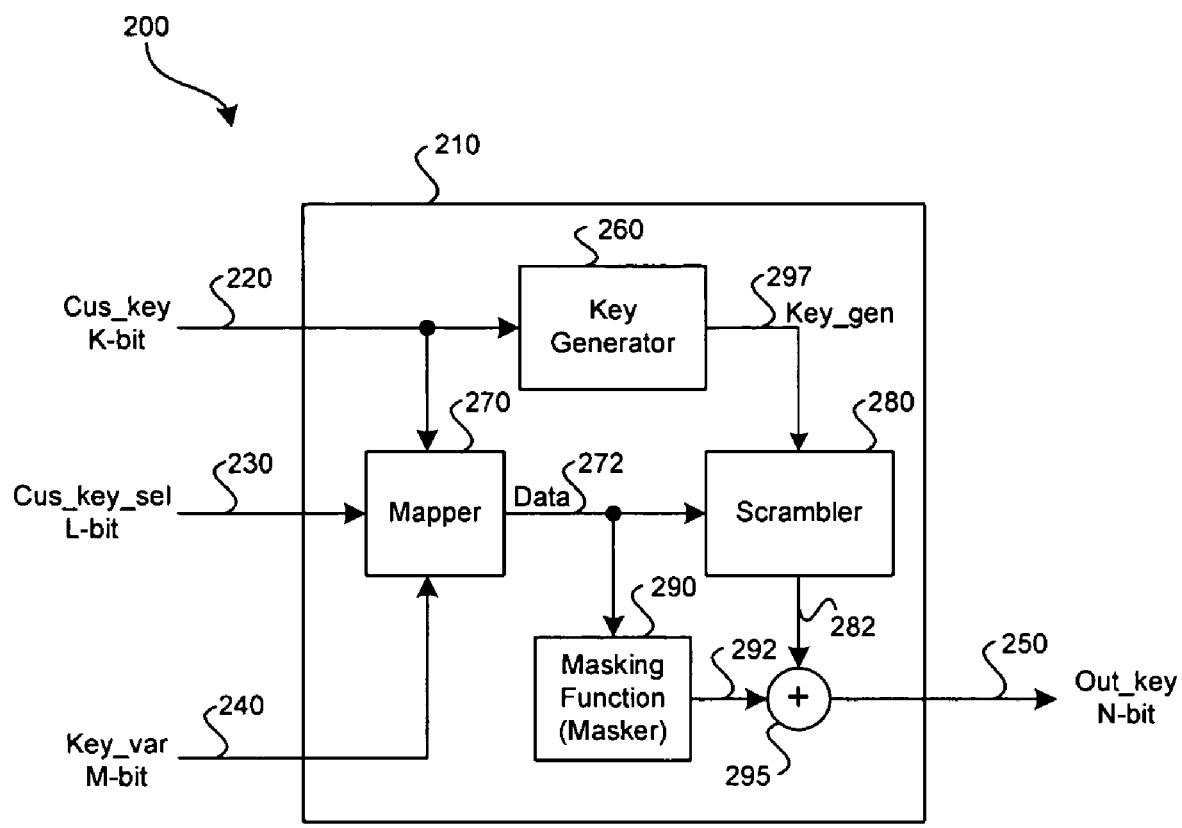
FIG. 2 is a block diagram of a secure key generation function that may be utilized to generate the output key from the plurality of input keys of FIG. 1, in accordance with an embodiment of the invention.

FIG. 2 is a block diagram 200 of a secure key generation function that may be utilized to generate the output key from the plurality of input keys of FIG. 1, in accordance with an embodiment of the invention. Referring to FIG. 2, the key generation function may comprise a key generator 260, a mapper 270, a scrambler 280, a masking function block or masker 290, and a XOR operator 295. Input cus_key 220 may be provided as an input to the key generator 260 and the mapper 270, and input keys cus_key_sel 230 and key_var may be provided as an input to the mapper 270. An output 297 of the key generator 260 may be coupled to the scrambler 280. An output 272 of the mapper 270 is coupled to an input of the masking function block 290 and an input to the scrambler 280. An output 282 of the scrambler 280 and an output 292 of the masking function block 290 may be coupled to the XOR operator 295. An output of the XOR operator 295 is the resultant N-bit output key, out_key 250. In this arrangement, each of the K-bit customer key 220, the L-bit customer key selection 230 and the M-bit key variation 240 may be mapped by the mapper 270.

The mapper 270 may comprise suitable mapping circuitry, logic and/or code that may be adapted to manipulate, for example, the customer key 220, the customer key selection vector 230 and the key variation vector to generate input data to the scrambler 280 and the masking function block 290. Accordingly, data 272 may be represented as: Data=MappingLogic(Cus_key, Cus_key_sel, Key_var).

In accordance with various aspects of the invention, the mapper 270 may be designed so that it may exhibit the following properties. The mapper 270 may operate as a diffusion process that smoothes out the statistical distributions among customer key 220, customer key selection vector 230 and key variation vector 240. The mapper 270 may be adapted to generate a fixed length output 272 that may be relatively simple to compute. The mapper 270 may be implemented so that it is a one way function, which is very difficult to invert. In this regard, when given a particular output 272 is generated by the mapper 270, the input may be extremely difficult to determine based on those inputs. The mapper 270 may also be configured to operate in a collision free manner for at least some customer keys. In this regard, no two inputs received by the mapper 207 may be mapped into the same output. In other words, the mapper is collision free for customer keys 220, customer key selection vectors 230 and their key variation vectors 240 and two distinct inputs may not produce or be mapped to the same output.

The key generator 260 may comprise suitable logic, circuitry and/or code that may be adapted to generate keys based on a received customer key 220. The key generator 260 may be designed so that there may be a one-to-one correspondence between the input, cus_key 220, and the output, gen_key 297.

The masking function block or masker 290 may comprise suitable logic, circuitry and/or code that may be adapted to increase the security of the scrambler 280. The masking function block or masker 290 may be designed in conjunction with the mapper 270 and key generator 260 to ensure that certain condition are maintained. For example, the output, out_key 250, may not be equivalent to a corresponding customer key, cus_key 220. In accordance with another aspect of the invention, the masking function block or masker 290 may be implemented so that the output key, out_key 250, may never be a weak key or a semi-weak key. For example, DES has four weak self-dual keys k for which $E_k(E_k(m))=m$ and twelve semi-weak keys which come in pairs $k_1$ and $k_2$ such that $E_{k1}(E_{k2}(m))=m$. Accordingly, the output key, out_key 250, may never be one of these weak and semi-weak keys if the output key 250 is to be utilized with a DES engine, for example. The following is a table illustrating exemplary weak and semi weak keys.

| Weak Keys | |
|---|---|
| KEY | DUAL |
| 0x0101010101010101 | 0x0101010101010101 |
| 0xFEFEFEFEFEFEFEFE | 0xFEFEFEFEFEFEFEFE |
| 0xE0E0E0E0F1F1F1F1 | 0xE0E0E0E0F1F1F1F1 |
| 0x1F1F1F1F0E0E0E0E | 0x1F1F1F1F0E0E0E0E |

| Semi-Weak Keys | |
|---|---|
| KEY (k1) | DUAL (k2) |
| 0xE001E001F101F101 | 0x01E001E001F101F1 |
| 0xFE1FFE1FFE0EFE0E | 0x1FFE1FFE0EFE0EFE |
| 0xE001FE01FF10EF10E | 0x1FE01FE00EF10EF1 |
| 0x01FE01FE01FE01FE | 0xFE01FE01FE01FE01 |
| 0x011F011F010E010E | 0x1F011F010E010E01 |
| 0xE0FEE0FEF1FEF1FE | 0xFEE0FEE0FEF1FEF1 |

Figure 3:
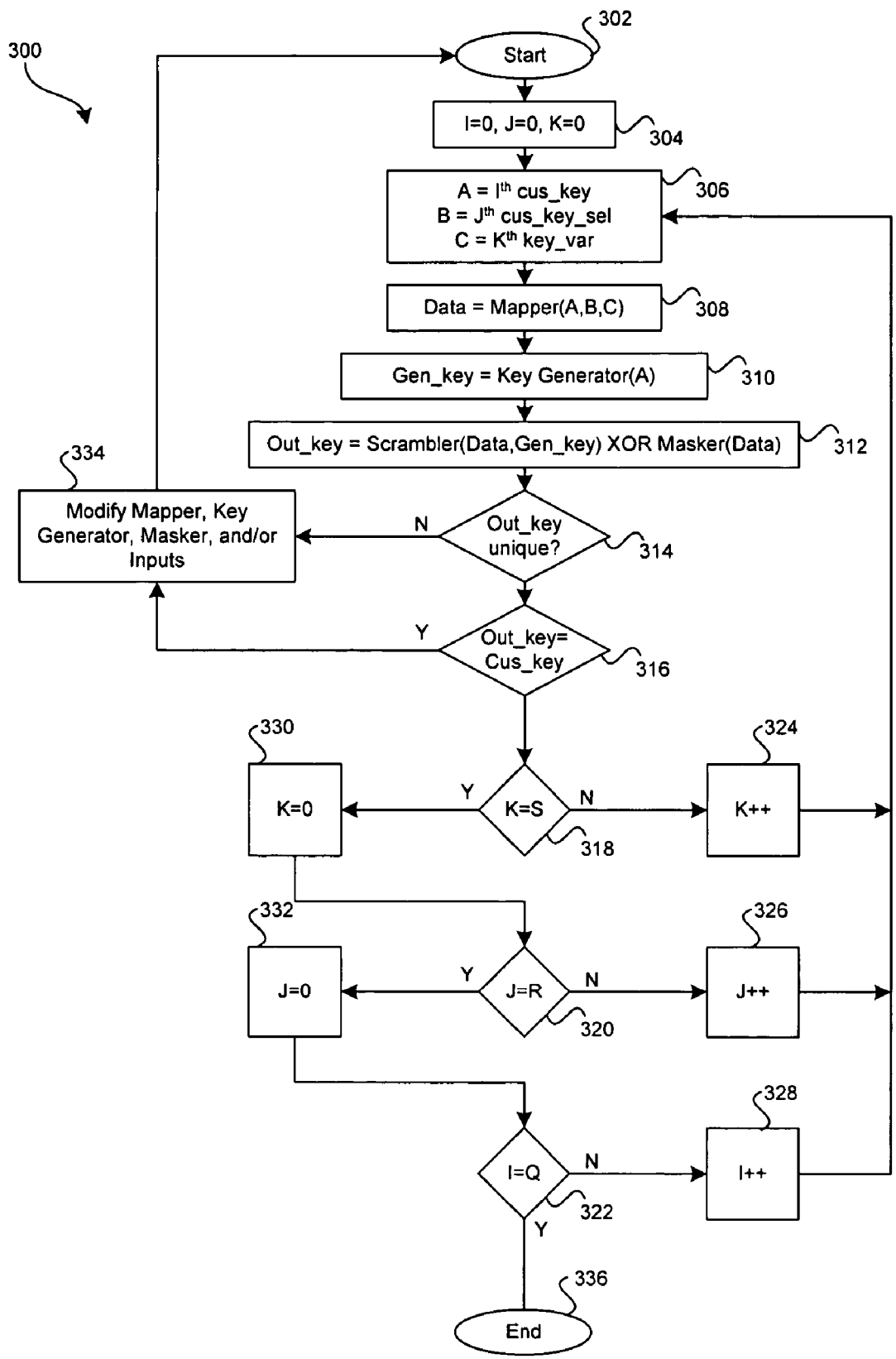
FIG. 3 is a flowchart that may be utilized in conjunction with the secure key generation function of FIG. 2 and which may be utilized to check the feasibility of generated keys, in accordance with an embodiment of the invention.

FIG. 3 is a flowchart 300 that may be utilized in conjunction with the secure key generation function of FIG. 2 and which may be utilized to check the feasibility of generated keys, in accordance with an embodiment of the invention. A configuration may be defined having inputs comprising Q different values of cus_key 220, R different values of cus_key_sel 230 for each cus_key 220 and S different values for key_var 240. These configuration values may be utilized in connection with the secure key generation function of FIG. 2. The general methodology is to loop through all the possible input combinations of the Q different values of cus_key 220, R different values of cus_key_sel 230 and S different values for key_var 240 in order to ensure that no conditions or requirements are violated. If a condition is violated, a change in the configuration of at least one of the Q different values of cus_key 220, R different values of cus_key_sel 230 and S different values for key_var 240 may be performed and these values may again be tested to determine whether a condition is violated. The counters I, J, K are reset to check that possible input combinations in the new configuration does not result in a violated condition.

Referring to FIG. 2 and FIG. 3, the exemplary steps may start at step 302. In step 302, counters I representing a current customer key I=1, . . . , Q, J representing the current customer key selection vector J=1, . . . , R, and K representing the key variation vector K=1, . . . , S may be initialized to zero (0). Referring to FIG. 3 and FIG. 2, in step 306, a $j^{th}$ customer key, cus_key is assigned to a value A, an $i^{th}$ customer key selection, cus_key_sel is assigned to a value B, and a $K^{th}$ key variation, key_varition is assigned to a value C. In step 308, the mapper 270 may then operate on the assigned values of A, B, C and generate output data 272. In step 310, the key generator 310 may operate on the assigned value A and generates output key_gen 297. The output data 272 from the mapper 270 is passed to the masker 290 and the scrambler 280. The mapper 290 after operating on the data 272 generates an output 292.

The output key_gen 297 from the key generator 260 is also passed to the scrambler 280. Accordingly, in step 312, the scrambler 280 may operate on the output data 272, the key_gen 297 generated from the key generator 260 and produces a output 282. The output 282 produced by the scrambler 280 and the output 292 produced by the masker 290 are also XOR in step 312 to produce the resultant output, out_key 250. Once the output key, out_key 250 has been generated, step 314 through step 334 may be utilized to determine whether the output key, out_key 250 is valid or has violated at least one of the previously stated conditions. The mapper, key generator, masker and/or key table may be adaptively changed based on, for example, a uniqueness of the output key.

Accordingly, in step 314, it may be determined whether the output key, out_key 250 is unique. If it is determined that the output key, out_key 250, is not unique, then in step 334, at least one of the mapper 270, key generator 260, masker 290 and/or the inputs A, B, C may be modified. Control may then pass to the start step 302 and new keys are generated based on the modified information from step 334. In step 314, if it is determined that the output key, out_key 250 is unique, then in step 316, it may be determined whether the output key 250 is equivalent to the customer key, cus_key or A. If it is determined that the output key, out_key 250 is the same as the customer key, cust_key 220, then in step 334, then at least one of the mapper 270, key generator 260, masker 290 and/or the inputs A, B, C may be modified. If it is determined that the output key, out_key 250 is not the same as the customer key, cust_key 220, then in step 318, it may be determined whether the value of K is equivalent to the value of S. On the initial pass through steps 302 to step 318, the value of K is zero (0) since it was initialized to zero (0). S represents the final value of the key variation vector in the sequence K=1, ..., S. If it is determined that the value of K is equivalent to the value of S, then in step 330, the value of K is initialized to zero (0). If it is determined the value of K is not equivalent to the value of S, then in step 324, the value of K is incremented by one and control passes back to step 306.

After the value of K has been initialized to zero (0) in step 330, then in step 320, it may be determined whether the value of J is equivalent to the value of R. On the initial pass through steps 302 to step 318, the value of J is zero (0) since it was initialized to zero (0). R represents the final value of the customer key selection vector in the sequence J=1, ..., R. If it is determined that the value of J is equivalent to the value of R, then in step 332, the value of J is initialized to zero (0). If it is determined the value of J is not equivalent to the value of R, then in step 326, the value of J is incremented by one and control passes back to step 306.

After the value of J has been initialized to zero (0) in step 332, then in step 322, it may be determined whether the value of I is equivalent to the value of Q. On the initial pass through steps 302 to step 318, the value of I is zero (0) since it was initialized to zero (0). S represents the final value of the customer key in the sequence I=1, ..., Q. If it is determined that the value of I is equivalent to the value of Q, then the exemplary steps end at step 336. If it is determined the value of I is not equivalent to the value of Q, then in step 328, the value of I is incremented by one and control passes back to step 306.

Figure 4:
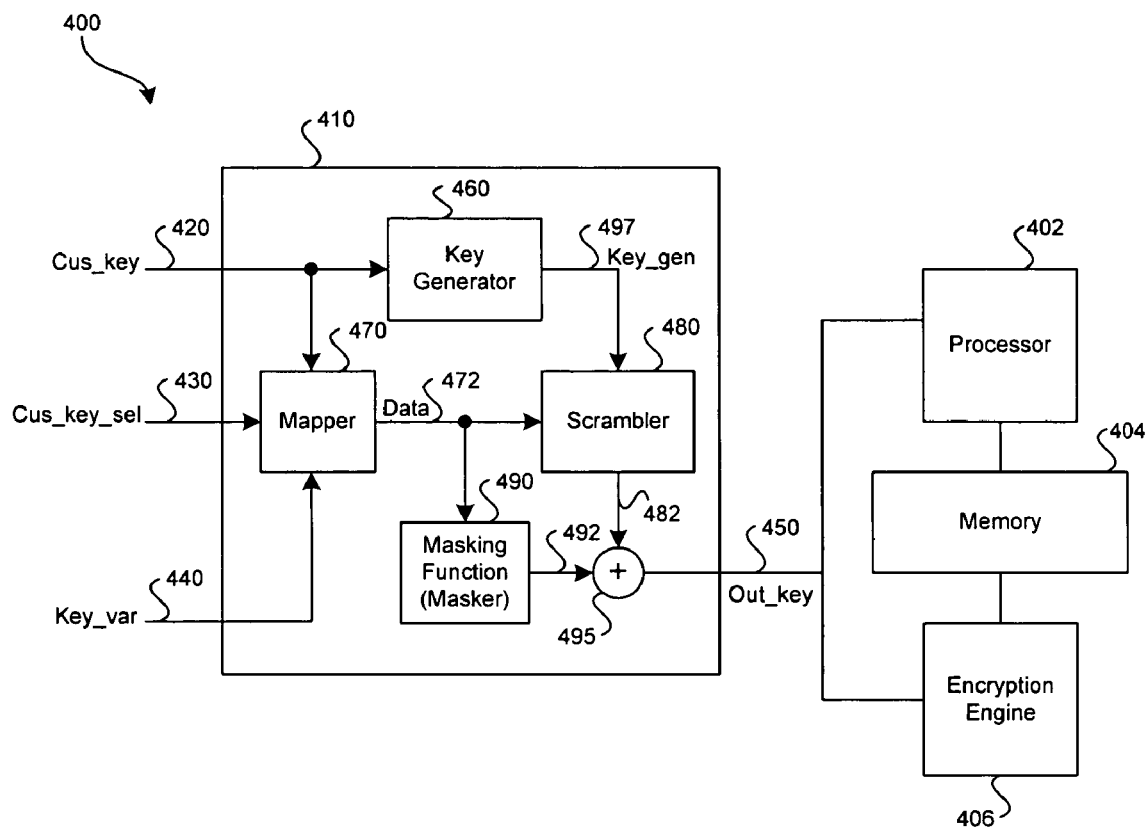
FIG. 4 is a block diagram of a secure key generation system that may be utilized to generate the output key from the plurality of input keys of FIG. 2, in accordance with an embodiment of the invention.

FIG. 4 is a block diagram 400 of a secure key generation system that may be utilized to generate the output key from the plurality of input keys of FIG. 2, in accordance with an embodiment of the invention. Referring to FIG. 4, the key generation function may comprise a key generator 460, a mapper 470, a scrambler 480, a masking function block or masker 490, and a XOR operator 495. The secure key generation system 400 may also comprise a processor 402, a memory 404 and an encryption engine 406.

Input cus_key 420 may be provided as an input to the key generator 460 and the mapper 470, and input keys cus_key_sel 430 and key_var 440 may be provided as an input to the mapper 470. An output of the key generator 460 may be coupled to the scrambler 480. An output of the mapper 470 may be coupled to an input of the masking function block 490 and an input to the scrambler 480. An output of the scrambler 480 and an output of the masking function block 490 may be coupled to a XOR operator 495. The processor 402 may be, for example, a microprocessor, a microcontroller or other type of encryption processor. The memory 404 may by a random access (RAM) memory such as a DRAM or SRAM, for example. The encryption engine 406 may be a DES, 3DES, AES or other encryption engine.

With reference to FIG. 4, the system 400 for producing a secure key may comprise a secure key generator 410 that receives at least a first input key 420, a second input key 430 and a third input key 440. Accordingly, the secure key generator 410 may generate a first output key 450 based on at least the first input key 420, the second input key 430 and the third input key 440. The first output key 450 is generated so that it is a unique key and so that it differs from at least the first input key 420. The first input key 420 may be a customer key, the second input key 430 may be a customer key selection and the third input key 440 may be a key variation. The secure key generator 410 may determine whether the first output key 450 is a unique key and is not equivalent to at least the first input key 420. If the first output key 450 is not unique key and/or is equivalent to at least the first input key 420, the secure key generator 410 may generate a second output key based on a modified one of the first input key 420, the second input key 430 and/or the third input key 440. The secure key generator 410 may also determine whether the second output key is a unique key and/or is not equivalent to at least the modified first input key, second input key and/or third input key. The first output key 450 and the second output key may not be a weak and/or a semi-weak key.

The system 400 may further comprise a mapper 470 that maps at least the first input key 420, the second input key 430 and the third input key 440 to generate mapped output key data 472. A key generator 460 may generate an intermediate key 497 based on the first input key 420. A scrambler 480 may scramble the generated intermediate key 497 and the generated mapped output key data 472 to create a scrambled output 482. A masker 490 may mask at least a portion of the generated mapped output key data 472 and an exclusive OR operator 495 may exclusive OR the masked portion of the generated mapped output key data 492 and the scrambled output 482 to generate the first output key 450. The secure key generator 410 may transfer the generated first output key 450 to an encryption engine 406 and the encryption engine 406 may utilize the generated first output key 450 to encrypt information.

Although the processor 402, the memory 404 and/or the encryption engine 406 are shown separately from the secure key generator 410, the invention is not so limited. Accordingly, any combination of the processor 402, memory 404 and/or encryption engine 406 may be integrated within or otherwise be a part of the secure key generator 410. In accordance with an embodiment of the invention, the processor 402 may be utilized to determine whether the generated key is valid and if so, the generated key may be kept. Otherwise, the generated key may be discarded. A table of valid keys or invalid keys may be stored in the memory 404. In this regard, whenever a key is generated, it may be compared to the valid or invalid keys that are stored in the memory 404. The memory 404 may also contain code for the processor 402 and/or the encryption engine 406.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for producing a secure key, the method comprising:
    receiving a plurality of input keys comprising a first input key, a second input key and a third input key;
    generating a first output key based on said plurality of input keys comprising said first input key, said second input key and said third input key; and
    continuing said generating of said first output key via a modified at least one of said plurality of input keys, until said first output key differs from at least one of said plurality of input keys, wherein said first output key is unique and differs from said at least one of said plurality of input keys, and said at least one of said plurality of input keys is a key variation comprising a device identity.

2. The method according to claim 1, wherein said first input key is a customer key, and/or a customer key selection.

3. The method according to claim 1, comprising determining whether said first output key is at least one of a unique key and differs from said at least said modified one of at least one of said first input key, said second input key and said third input key.

4. The method according to claim 3, wherein said first output key is not a weak or semi-weak key.

5. The method according to claim 1, comprising mapping said at least said first input key, said second input key and said third input key to generate mapped output key data.

6. The method according to claim 5, comprising generating an intermediate key based on said first input key.

7. The method according to claim 6, comprising scrambling said generated intermediate key and said generated mapped output key data to create a scrambled output.

8. The method according to claim 7, comprising:
    masking at least a portion of said generated mapped output key data; and
    exclusive ORing said masked at least said portion of said generated mapped output key data and said scrambled output to generate said first output key.

9. The method according to claim 1, comprising transferring said generated first output key to an encryption engine that utilizes said generated first output key to encrypt information.

10. A machine-readable storage having stored thereon, a computer program having at least one code section for producing a secure key, the at least one code section being executable by a machine for causing the machine to perform steps comprising:
    receiving a plurality of input keys comprising a first input key, a second input key and a third input key;
    generating a first output key based on said plurality of input keys comprising said first input key, said second input key and said third input key; and
    continuing said generating of said first output key via a modified at least one of said plurality of input keys, until said first output key differs from at least one of said plurality of input keys, wherein said first output key is unique and differs from said at least one of said plurality of input keys, and said at least one of said plurality of input keys is a key variation comprising a device identity.

11. The machine-readable storage according to claim 10, wherein said first input key is a customer key, and/or a customer key selection.

12. The machine-readable storage according to claim 10, wherein said at least one code section comprises code for determining whether said first output key is at least one of a unique key and differs from said at least said modified one of at least one of said first input key, said second input key and said third input key.

13. The machine-readable storage according to claim 12, wherein said first output key is not a weak or semi-weak key.

14. The machine-readable storage according to claim 10, wherein said at least one code section comprises code for mapping said at least said first input key, said second input key and said third input key to generate mapped output key data.

15. The machine-readable storage according to claim 14, wherein said at least one code section comprises code for generating an intermediate key based on said first input key.

16. The machine-readable storage according to claim 15, wherein said at least one code section comprises code for scrambling said generated intermediate key and said generated mapped output key data to create a scrambled output.

17. The machine-readable storage according to claim 16, wherein said at least one code section comprises:
   code for masking at least a portion of said generated mapped output key data; and
   code for exclusive ORing said masked at least said portion of said generated mapped output key data and said scrambled output to generate said first output key.

18. The machine-readable storage according to claim 10, wherein said at least one code section comprises code for transferring said generated first output key to an encryption engine that utilizes said generated first output key to encrypt information.

19. A system for producing a secure key, the system comprising:
   a secure key generator that receives a plurality of input keys comprising a first input key, a second input key and a third input key;
   said secure key generator generates a first output key based on said plurality of input keys comprising said first input key, said second input key and said third input key; and
   said secure key generator continues said generating of said first output key via a modified at least one of said plurality of input keys, until said first output key differs from at least one of said plurality of input keys, wherein said first output key is unique and differs from said at least one of said plurality of input keys, and said at least one of said plurality of input keys is a key variation comprising a device identity.

20. The system according to claim 19, wherein said first input key is a customer key, and/or a customer key selection.

21. The system according to claim 19, wherein said secure key generator determines whether said first output key is at least one of a unique key and differs from said at least said modified one of at least one of said first input key, said second input key and said third input key.

22. The system according to claim 21, wherein said first output key is not a weak or semi-weak key.

23. The system according to claim 19, comprising a mapper that maps said at least said first input key, said second input key and said third input key to generate mapped output key data.

24. The system according to claim 23, comprising a key generator that generates an intermediate key based on said first input key.

25. The system according to claim 24, comprising a scrambler that scrambles said generated intermediate key and said generated mapped output key data to create a scrambled output.

26. The system according to claim 25, comprising:
   a masker that masks at least a portion of said generated mapped output key data; and
   an exclusive OR operator that exclusive ORs said masked at least said portion of said generated mapped output key data and said scrambled output to generate said first output key.

27. The system according to claim 19, wherein said secure key generator transfers said generated first output key to an encryption engine that utilizes said generated first output key to encrypt information.

28. A system for producing a secure key, the system comprising:
   a mapper;
   a scrambler coupled to said mapper;
   a masker coupled to said mapper;
   a key generator coupled to said scrambler; and
   an XOR operator coupled to said masker and said scrambler.

29. The system according to claim 28, comprising at least one processor coupled to an output of said XOR operator.

30. The system according to claim 29, comprising an encryption engine that is coupled to an output of said XOR operator.

31. The system according to claim 30, comprising a memory coupled to at least one of said encryption engine and said at least one processor.

32. A system for producing a secure key, the system comprising:
   one or more circuits enabled to:
      receive a plurality of input keys comprising a first input key, a second input key and a third input key at a secure key generator;
      generate at said secure key generator a first output key based on said plurality of input keys comprising said first input key, said second input key and said third input key; and
      continue said generating of said first output key via a modified at least one of said plurality of input keys, until said first output key differs from at least one of said plurality of input keys, wherein said first output key is unique and differs from said at least one of said plurality of input keys, and said at least one of said plurality of input keys is a key variation comprising a device identity.

33. The system according to claim 32, wherein said first input key is a customer key, and/or a customer key.

34. The system according to claim 32, wherein said one or more circuits determine whether said first output key is at least one of a unique key and differs from said at least said modified one of at least one of said first input key, said second input key and said third input key.

35. The system according to claim 34, wherein said first output key is not a weak or semi-weak key.

36. The system according to claim 32, wherein said one or more circuits comprise a mapper that maps said at least said first input key, said second input key and said third input key to generate mapped output key data.

37. The system according to claim 36, wherein said one or more circuits comprise a key generator that generates an intermediate key based on said first input key.

38. The system according to claim 37, wherein said one or more circuits comprise a scrambler that scrambles said generated intermediate key and said generated mapped output key data to create a scrambled output.

39. The system according to claim 38, wherein said one or more circuits comprise:
   a masker that masks at least a portion of said generated mapped output key data; and
   an exclusive OR operator that exclusive ORs said masked at least said portion of said generated mapped output key data and said scrambled output to generate said first output key.

40. The system according to claim 32, wherein said one or more circuits transfer said generated first output key to an encryption engine that utilizes said generated first output key to encrypt information.

41. A system for producing a secure key, the system comprising one or more circuits, said one or more circuits enabled to operate as:
   a mapper;
   a scrambler coupled to said mapper;
   a masker coupled to said mapper;
   a key generator coupled to said scrambler; and
   an XOR operator coupled to said masker and said scrambler.

42. The system according to claim 41, wherein said one or more circuits comprise at least one processor coupled to an output of said XOR operator.

43. The system according to claim 42, wherein said one or more circuits comprise an encryption engine that is coupled to an output of said XOR operator.

44. The system according to claim 43, wherein said one or more circuits comprise a memory coupled to at least one of said encryption engine and said at least one processor.

* * * * *